United States Patent [19]
Ryan

[11] Patent Number: 5,167,433
[45] Date of Patent: Dec. 1, 1992

[54] VEHICLE LUGGAGE COMPARTMENT LINER

[75] Inventor: Patrick T. Ryan, Lower Sackville, Canada

[73] Assignee: Plastics Maritime Ltd., Halifax, Canada

[21] Appl. No.: 758,592

[22] Filed: Sep. 12, 1991

[30] Foreign Application Priority Data

Sep. 12, 1990 [CA] Canada ................................. 2025217

[51] Int. Cl.$^5$ .............................................. B62D 33/06
[52] U.S. Cl. ................................. 296/37.1; 296/24.1; 296/39.1; 220/533
[58] Field of Search ..................... 296/39.1, 37.1, 37.6, 296/24.1, 76; 224/42.42; 220/533, 532

[56] References Cited

U.S. PATENT DOCUMENTS

| | | | |
|---|---|---|---|
| 4,305,695 | 12/1981 | Zachrich | 296/37.1 |
| 4,718,584 | 1/1988 | Schoeny | 224/42.42 |
| 4,807,760 | 2/1989 | Sussman | 220/533 |
| 5,025,964 | 6/1991 | Phirippidis | 296/37.1 |
| 5,054,668 | 10/1991 | Ricchiuti | 224/42.42 |
| 5,083,827 | 1/1992 | Hollenbaugh, Sr. | 296/37.1 |

*Primary Examiner*—Robert R. Song
*Attorney, Agent, or Firm*—R. Craig Armstrong

[57] ABSTRACT

A plastic liner is provided for use in a vehicle luggage compartment. The liner has a bottom conforming generally to the shape of the luggage compartment floor, and integral rear, side and front walls, at least some of which generally conform to the walls of the luggage compartment. Integral or removable dividers may be provided to compartmentalize the liner. Grooves may be provided in the liner wall to support such dividers.

12 Claims, 14 Drawing Sheets

VEHICLE LUGGAGE COMPARTMENT LINER

BACKGROUND OF THE INVENTION

This invention relates to a liner for the luggage compartment liner of a vehicle.

Historically, luggage compartment areas, particularly automobile trunks, have been lacking in several respects for the user. Firstly, dirt and spills are difficult to clean up because there is often poor accessibility to the luggage compartment area, particularly in the case of automobile trunks, making cleaning efforts awkward. Corrosive and grimy substances stain and even damage the luggage compartment carpeting and flooring.

Secondly, there is a desire and need to utilize luggage compartments to carry corrosive and grimy substances and like, but there is a reluctance to do so because of the negative results.

Thirdly, luggage compartment areas commonly have poor storage and organization capability, and the present invention addresses that problem as well.

SUMMARY OF THE INVENTION

It is an object of the invention to provide a liner for use in vehicle luggage compartments. The liner is offered as a means of enabling users to broaden luggage compartment usage without fear of damage to the luggage compartment area and with the knowledge that virtually any resulting mess can be cleaned up in minutes. The liner also improves storage capability.

Thus in accordance with the present invention a plastic liner is provided for use in a vehicle luggage compartment. The liner has a bottom conforming generally to the shape of the luggage compartment floor, and integral rear, side and front walls, at least some of which generally conform to walls of the luggage compartment. Optional dividers may be provided. The dividers may be ribbed or otherwise profiled for greater rigidity and strength, and may be supported by grooves in the walls of the liner.

The liner can be adapted to the luggage compartment of virtually any vehicle, including but not limited to automobile trunks, station wagon rear compartments, and van, minivan or "4×4" luggage areas.

Further features of the invention will be described or will become apparent in the course of the following detailed description.

Throughout this description, in the interest of consistency and certainty, "front" is with reference to the front of the vehicle, and "rear" or "back" is with reference to the rear of the vehicle. Thus, for example, the rear of an automobile trunk is intended to mean the portion nearest the rear of the automobile.

BRIEF DESCRIPTION OF THE DRAWINGS

In order that the invention may be more clearly understood, the preferred and alternative embodiments thereof will now be described in detail by way of example, with reference to the accompanying drawings, in which.

DETAILED DESCRIPTION OF THE PREFERRED EMBODIMENTS

Figure 1:
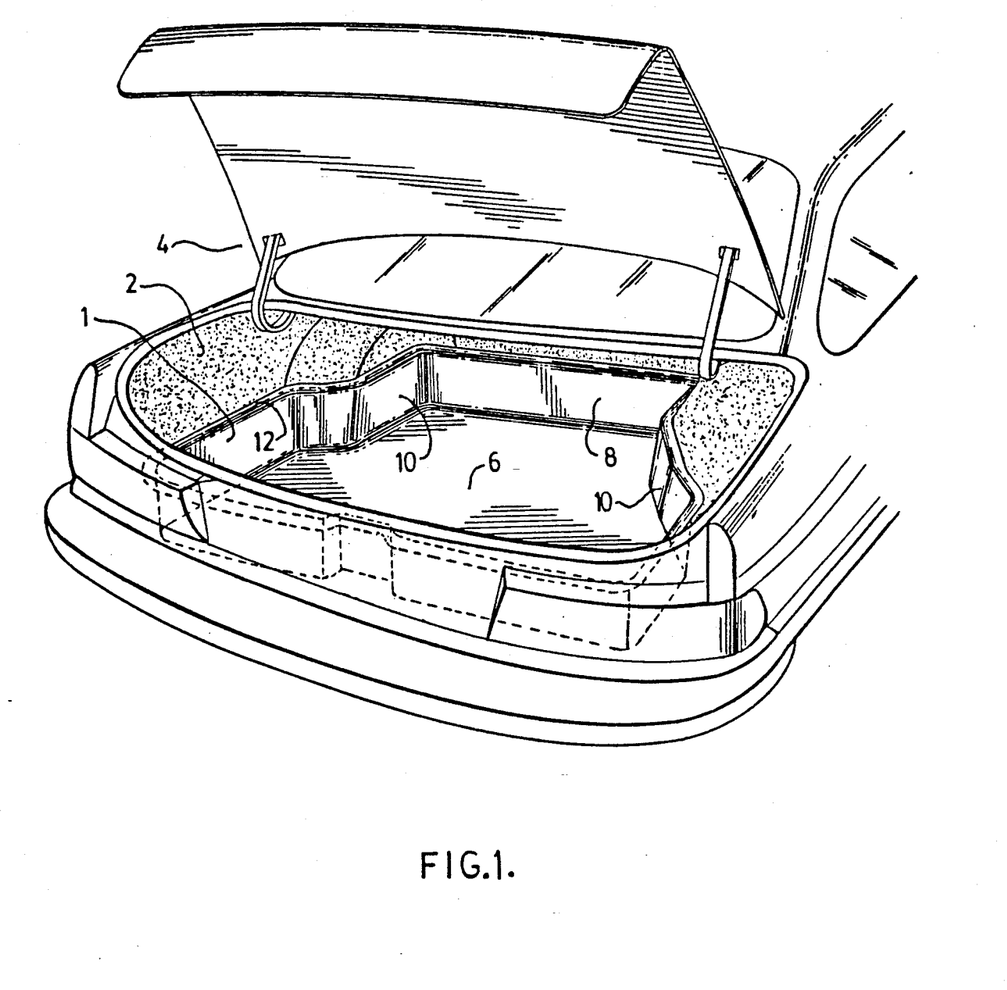
FIG. 1 is a perspective view showing the liner in the trunk of an automobile.
Figure 2:
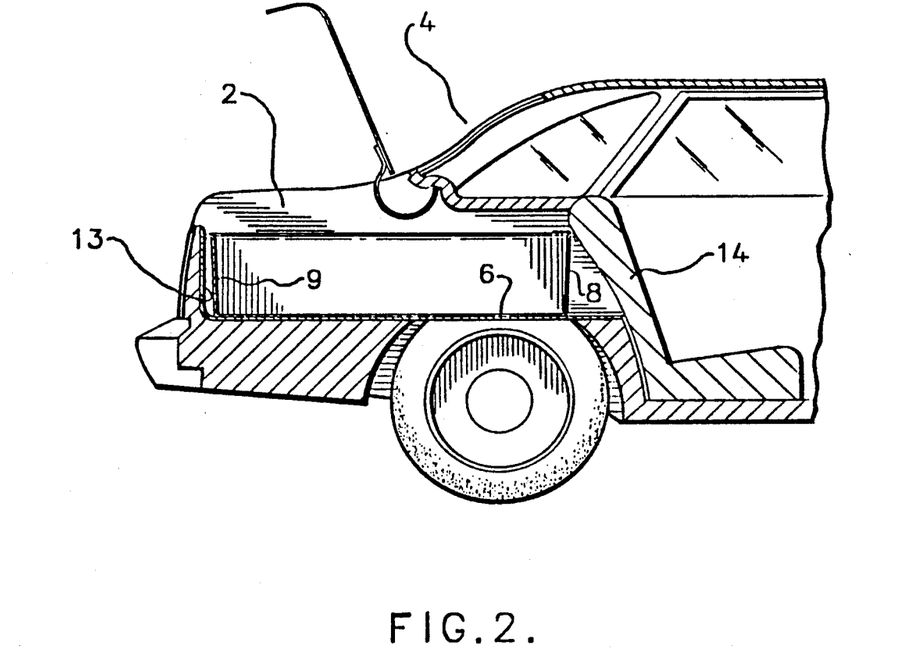
FIG. 2 is a corresponding side sectional view.
Figure 3:
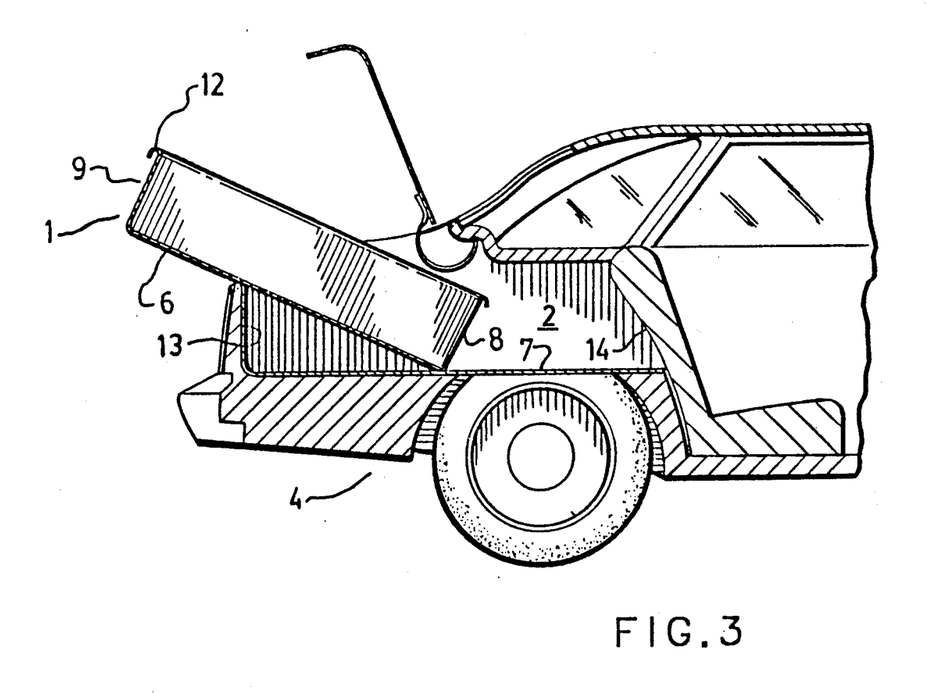
FIG. 3 is a side sectional view showing the liner partially inserted in the trunk.
Figure 4:
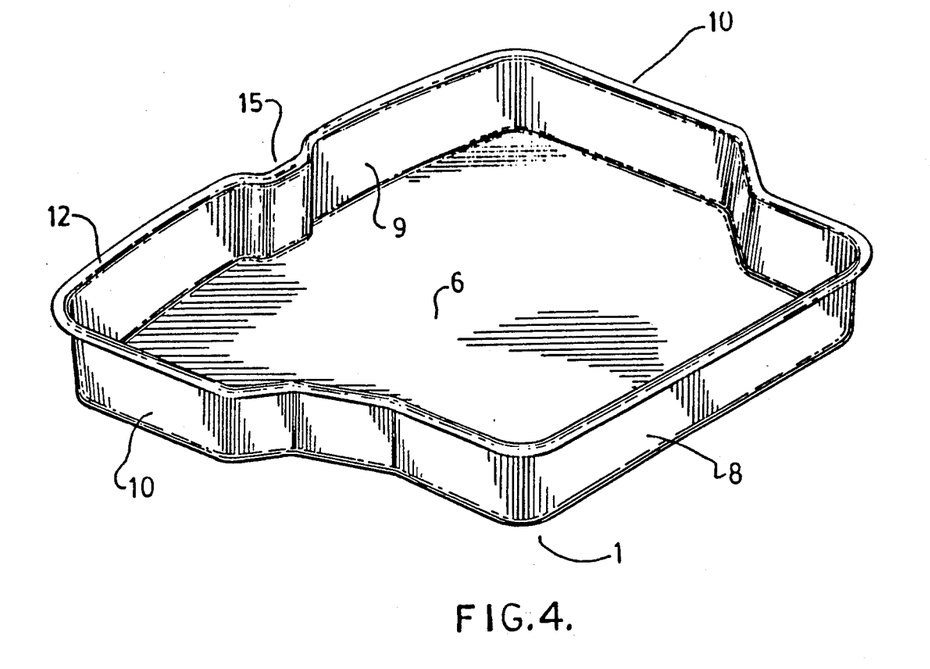
FIG. 4 is a perspective showing the basic, simplest embodiment of the invention.
Figure 5:
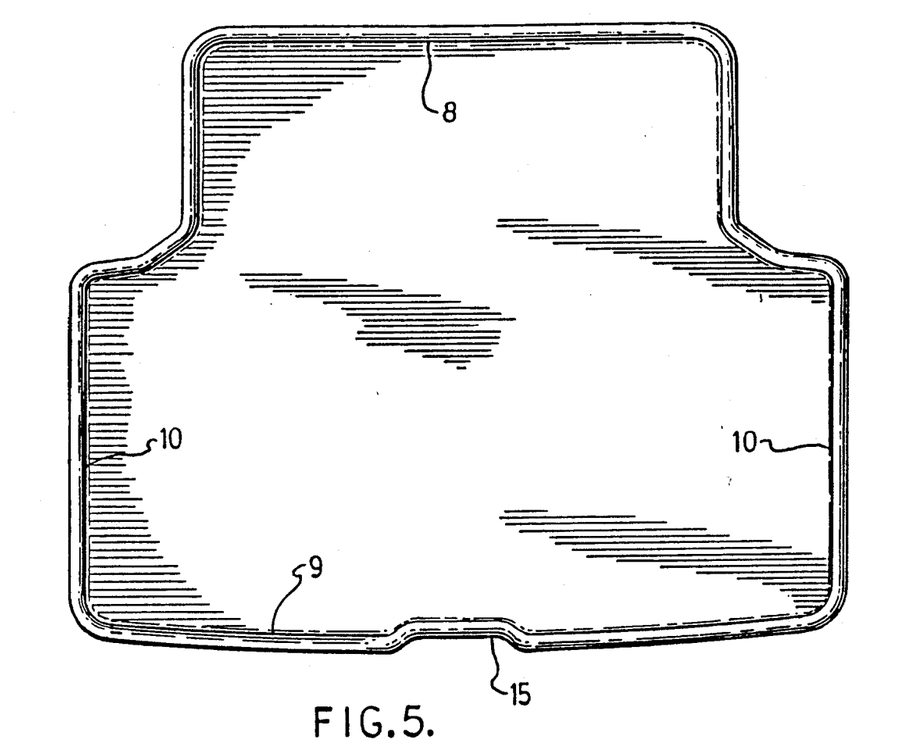
FIG. 5 is a plan view of the basic embodiment.
Figure 6:
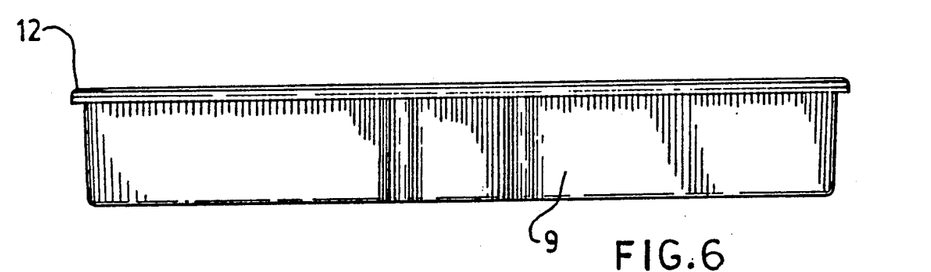
FIG. 6 is a side view of the basic embodiment.
Figure 7:
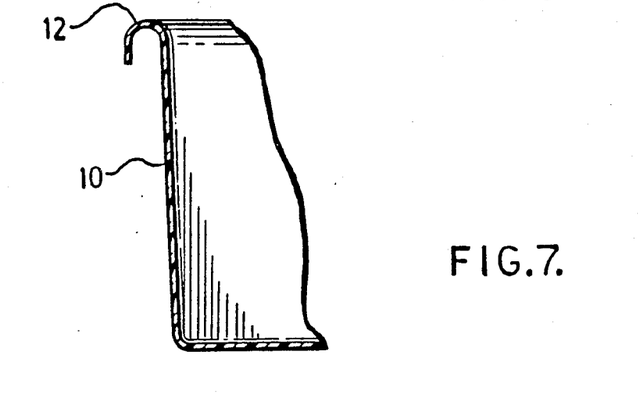
FIG. 7 is a sectional view showing the curled lip of the liner.

Referring now to the drawings, FIGS. 1-3 show the preferred embodiment of the liner 1, installed in the trunk 2 of an automobile 4. The liner has a bottom 6 conforming generally to the shape of the floor 7 of the trunk, and integral front, rear and side walls 8, 9 and 10 respectively. The front, rear and side walls conform generally to the shape of the trunk. In many cases, this means that the side walls narrow in, as seen in FIG. 4, for example, since trunks in most automobiles are narrower at the front, i.e. towards the front of the vehicle, due to the need for clearance space for the wheels.

The liner preferably is molded in one piece for strength and water tightness, i.e. so that it will contain spills. The average wall thickness of the finished product is preferably in the range of anywhere from 0.06" to 0.30", depending on the size of liner being formed. The liner may be molded from any number of structural thermoplastic or thermoset materials or rubberized thermoplastic or combinations thereof (e.g. acrylic/FRP). These synthetic polymers or copolymers are of high molecular weight, thereby producing a rigid molded structure. For example, thermoplastics such as ABS, polyethylene, acrylic, polycarbonate, polyvinyl chloride, polystyrene, or polypropylene could be used, in a mono or multi layer composition. In the category of thermosetting plastics, FRP (fibreglass reinforced polyester) could be used. Preferably, all corners have liberal radii, so that stress points are reduced and cleaning is facilitated.

FIGS. 4–7 show the simplest embodiment of the invention.

Figure 8:
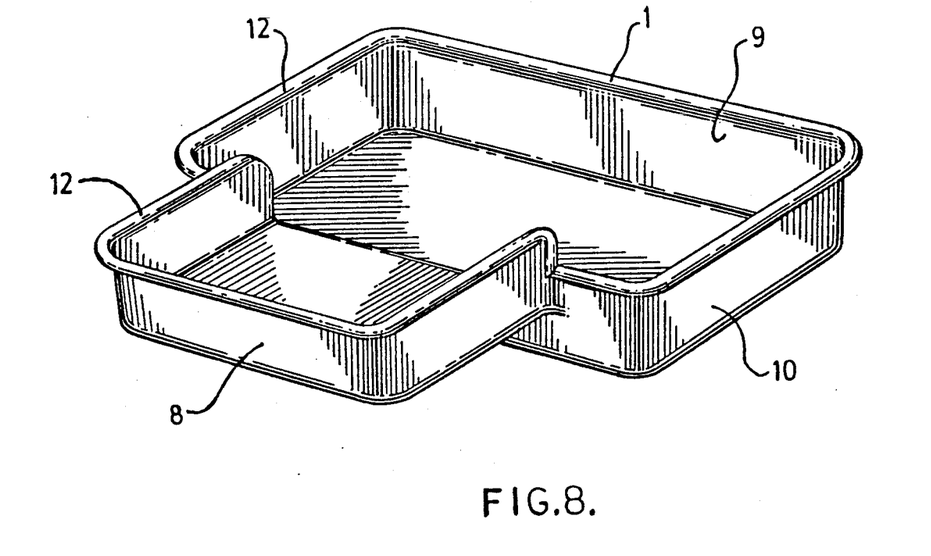
FIG. 8 is a perspective view of an alternative embodiment of the liner, showing the lip in two different planes.

Preferably, the liner is provided with a curled lip 12 on the top edges thereof, for improved structural integrity and ease of handling. Preferably, that curved lip on the top outer edge is in one plane to facilitate molding. If necessary, however, the curled lip could be on one or more planes for best fit of the individual luggage compartment. For example, FIG. 8 shows a liner in which the lip is in more than one plane, one end being higher than the other.

Figure 9:
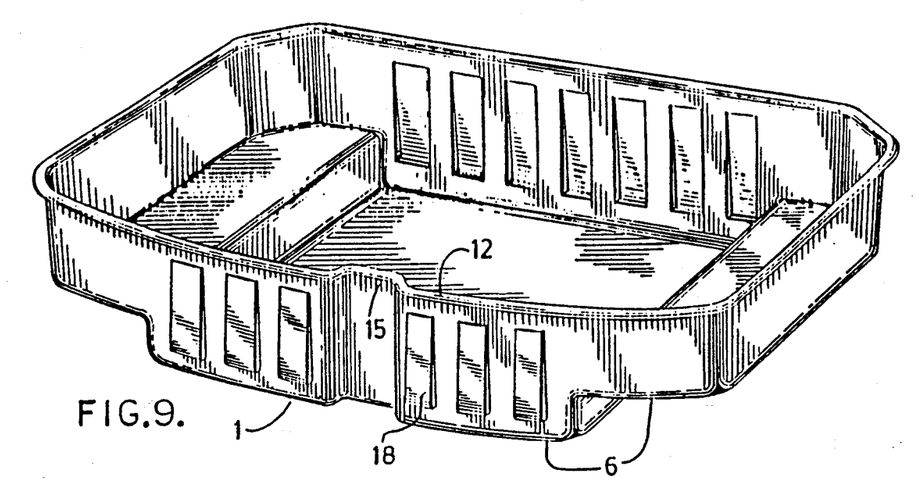
FIG. 9 is a perspective view of an alternative embodiment of the liner, showing the bottom in two different planes.

Similarly, FIG. 9 shows a liner in which the bottom 6 is in more than one plane, to accommodate a trunk floor which has more than one level.

The front, rear and side walls of the liner, although generally conforming to the shape of the luggage compartment, do not necessarily contact all walls of the luggage compartment. Preferably, however, the liner walls do interact with at least two opposite luggage compartment walls or portions thereof, to form a compression fit of the liner, which prevents sliding of the liner when the vehicle is in motion. The portion of the liner in compression contact with the luggage compartment will most likely be the curled lip 12 on the upper edge, but not necessarily. The compression should be such that installation and removal of the liner can still be performed with ease, i.e. there should not be too much compression. As illustrated in FIG. 2, the compression could be front to rear, i.e. the liner could be pinched between the rear wall 13 of the trunk and the back of the seat 14. Alternatively, the compression could be from side to side, over part or all of the side walls.

It should be clearly understood that not all walls of the liner need to conform to the shape of the luggage compartment, although that may be preferable. For example, in the case of a station wagon or mini-van, there may be no rear luggage compartment wall as such, although of course a "wall" of sorts is formed when the rear hatch or gate is closed. The liner may be sized such that closing the hatch or gate in such a situation brings it into contact with the liner, to thus secure its position, or it may be that the liner in such a situation relies on side-to-side pinching to prevent it from sliding around.

The length, width and height of the liner should be optimized so that the largest percentage of the luggage compartment is lined, and yet the liner may still be removed easily from the luggage compartment. In the case of luggage compartments where the luggage compartment opening is smaller than the dimensions of the overall luggage compartment space, it may be necessary to limit the width of the liner to the width of the luggage compartment opening. In such a case, front to back compression may be required to keep the liner in place. That is, in some vehicles the luggage compartment opening is not as wide as the luggage compartment area itself.

As can be appreciated from an examination of FIG. 3, the height of the liner may have to be kept to a maximum limit, since it may not be possible to fit a high-sided liner in and out of certain luggage compartments. High sides are not essential in any event, since they increase the cost of the liner without necessarily improving performance.

Figure 10:
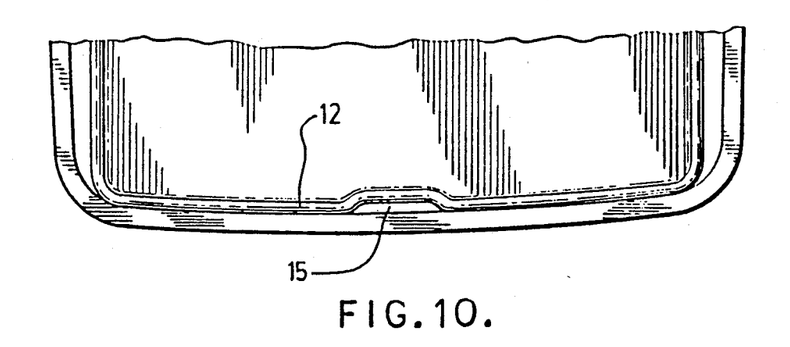
FIG. 10 is a plan view, showing a single hand grip area.
Figure 11:
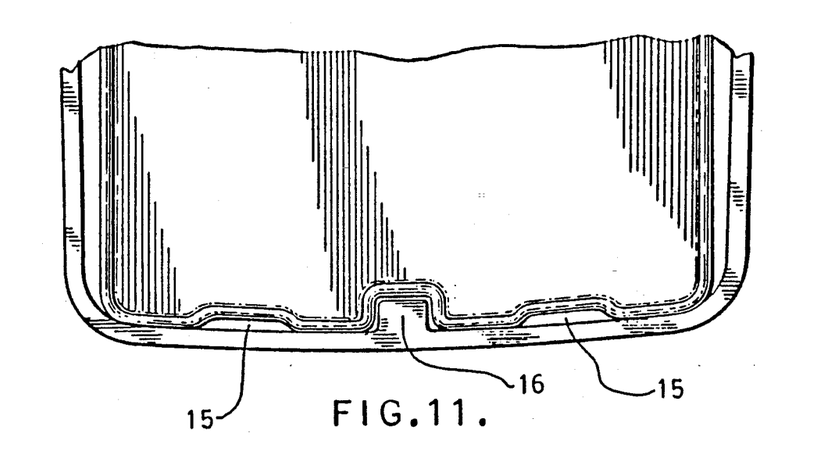
FIG. 11 is a plan view, showing a double hand grip area.

Preferably, as shown in FIG. 10, at least one hand grip area 15 is formed integrally with the curled lip 12, to facilitate liner removal. In certain types of luggage compartments, such as the one illustrated in FIG. 11 where the trunk has a protrusion 16 which prevents a rear center location for a hand grip, two hand grip areas 15 may be better than one for facilitating handling. Obviously, it would be possible to have even more handgrips, or none at all.

Figure 12:
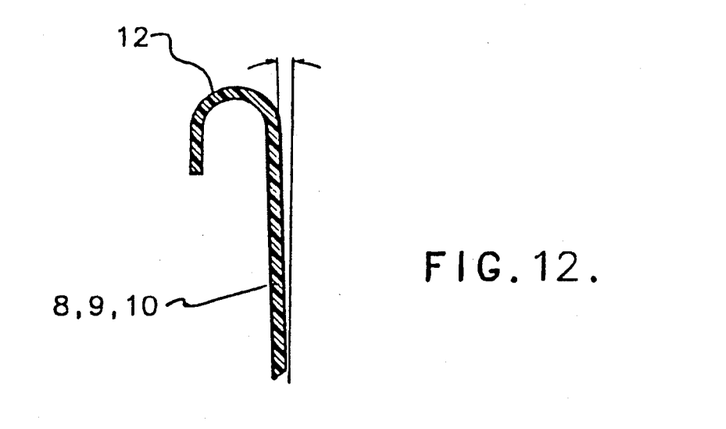
FIGS. 12-15 are side sectional views, showing variations of the lip of the liner.

As illustrated in FIG. 12, the front, rear and side walls of the liner taper preferably inwardly from top to bottom for ease of molding. A taper of 2 degrees or more is preferred, so that an adequate draft in the mold is provided to facilitate removal of the liner from the mold. Such a taper also makes the product easier for nesting for shipping.

Figure 13:
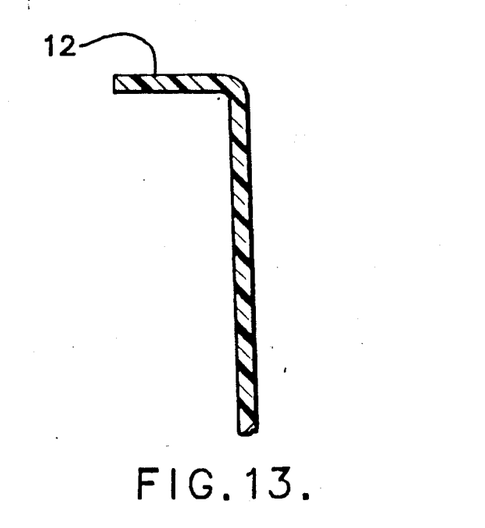
Figure 14:
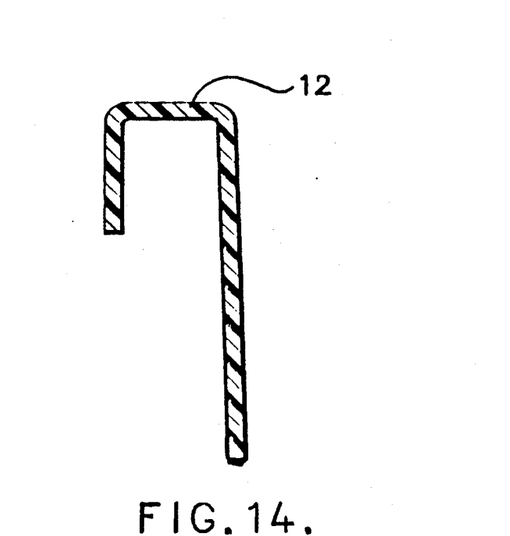
Figure 15:
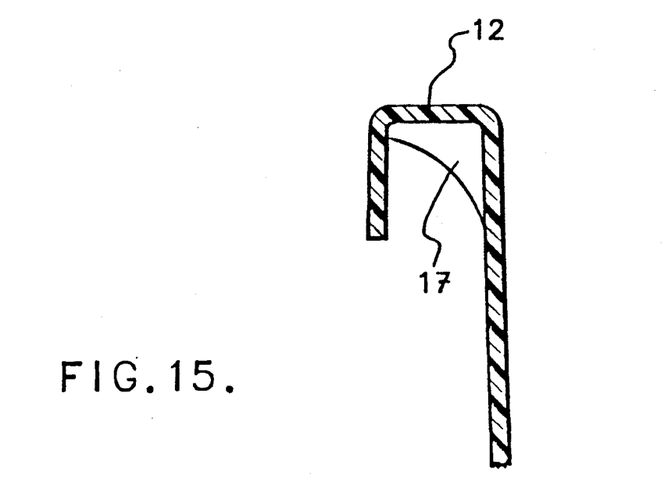

FIGS. 13–15 show alternative configurations for the lip 12, i.e. respectively a straight flange, a relatively square U-shaped lip, and a relatively square U-shaped lip with spaced reinforcement ribs 17.

Figure 16A:
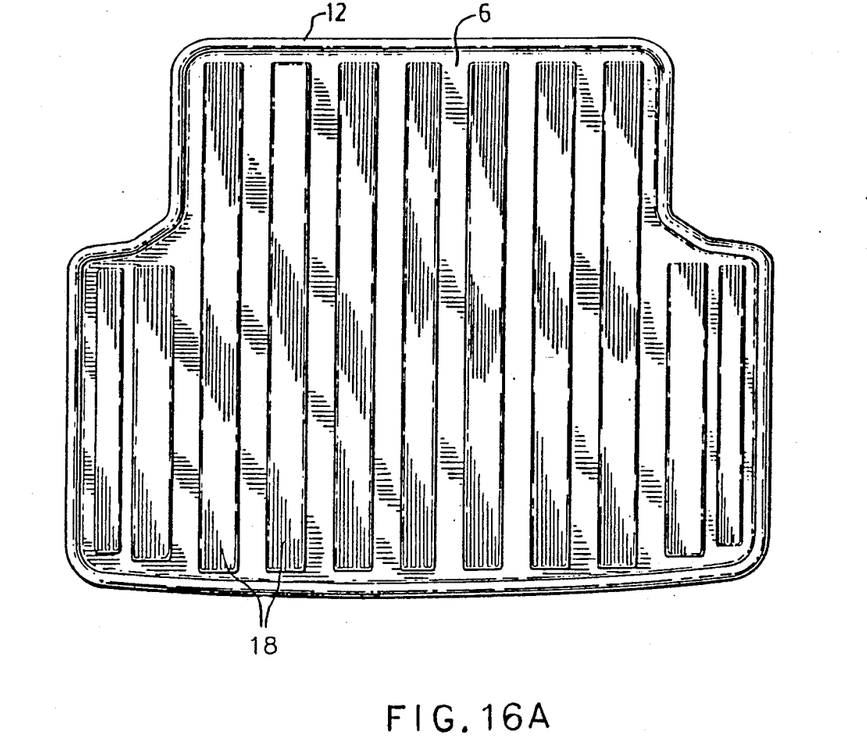
FIG. 16A is a plan view showing a liner having strengthening ribs.
Figure 16B:
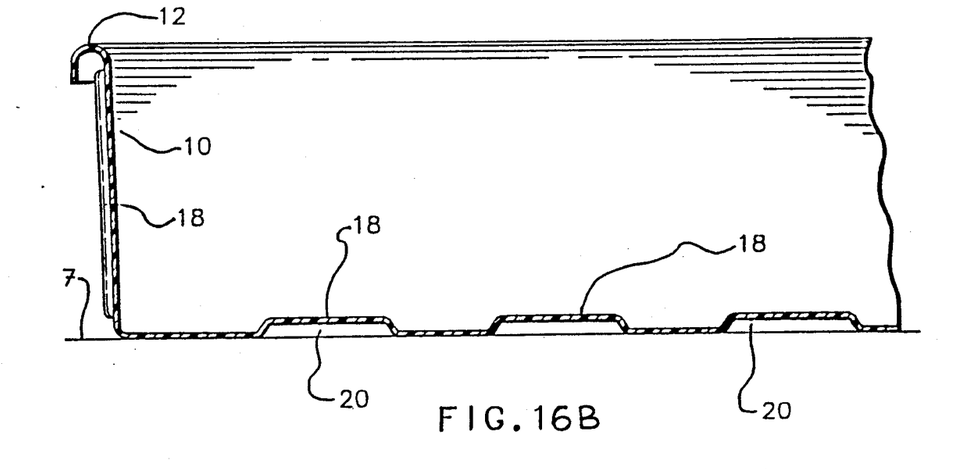
FIG. 16B is a sectional view of the liner of FIG. 16A.

The sides and bottoms of the liner may be flat, but not necessarily. As an alternative, as shown in FIGS. 9, 16A and 16B, structural ribs 18 may be formed as an integral part of the bottom and/or walls for the purposes of added strength and also to cut down on the possibility of condensation forming between the luggage compartment surface and the exterior surface of the liner. As shown in FIG. 16B, having ribs on the bottom permits a certain amount of air flow through the openings 20, to reduce the likelihood of condensation. Using ribs of course also has the advantage that the liner can be formed from thinner material, thereby reducing costs.

Figure 17A:
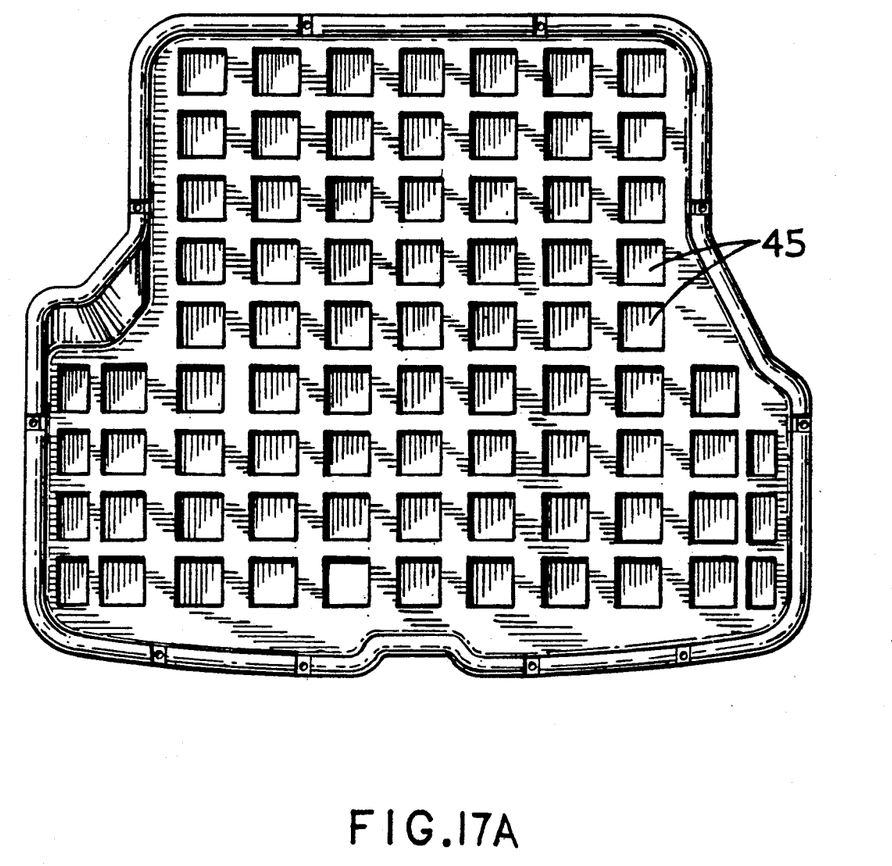
FIG. 17A is a plan view showing a liner having strengthening square depressions.
Figure 17B:
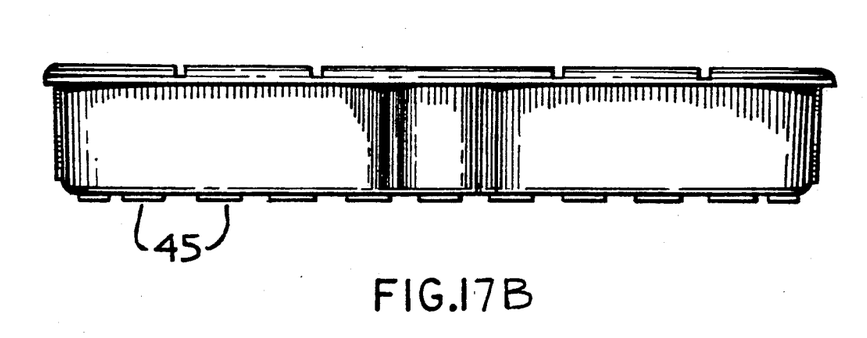
FIG. 17B is an elevation view corresponding to FIG. 17A.
Figure 18A:
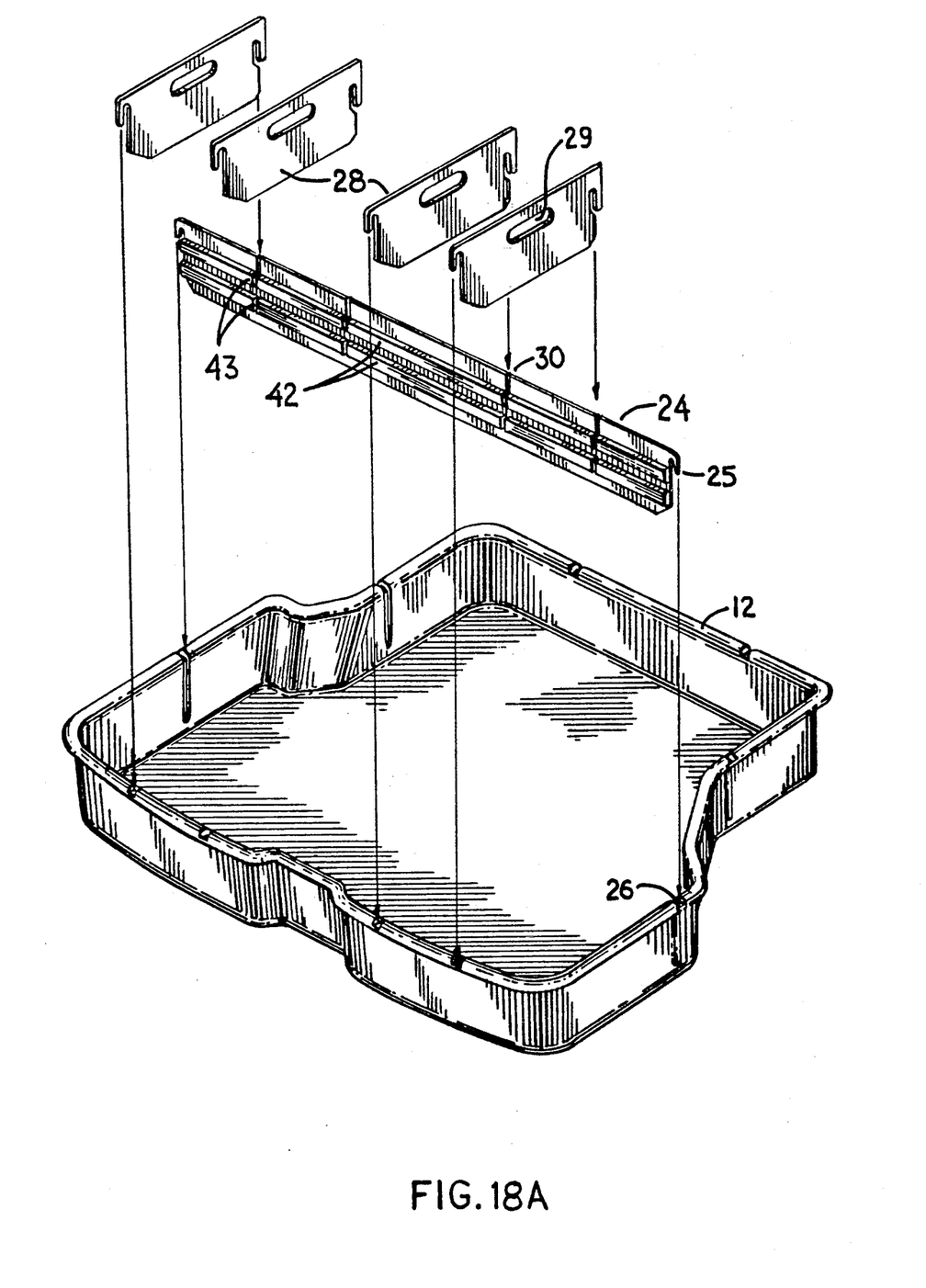
FIG. 18A is an exploded perspective view of a liner having removable dividers.
Figure 18B:
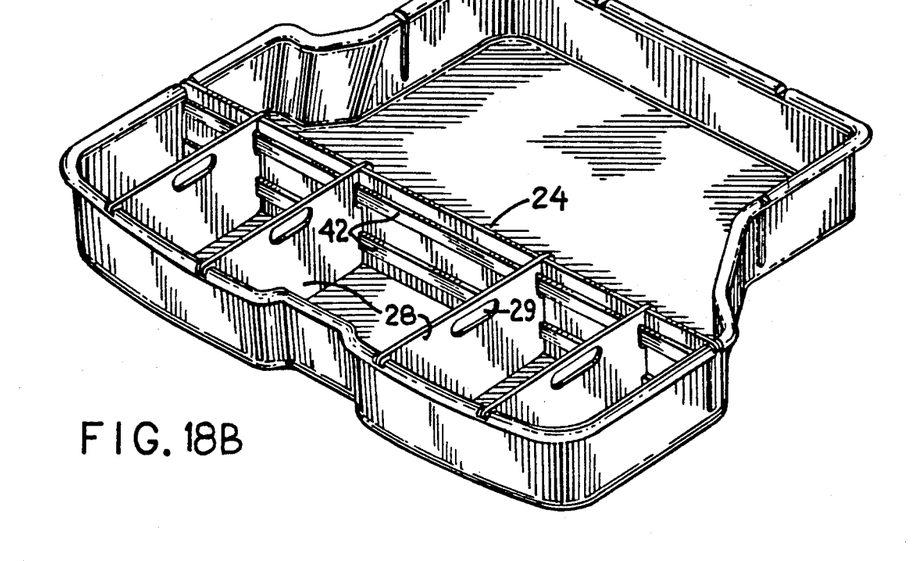
FIG. 18B is a perspective corresponding to FIG. 18A.
Figure 18C:
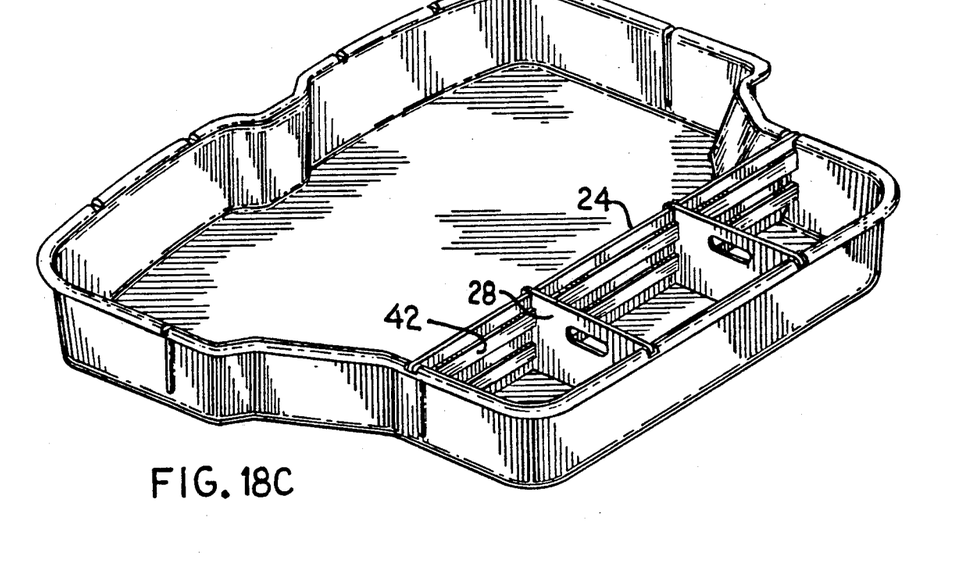
FIG. 18C is a perspective similar to FIGS. 18A and 18B, but with the dividers in the back portion of the liner.
Figure 19:
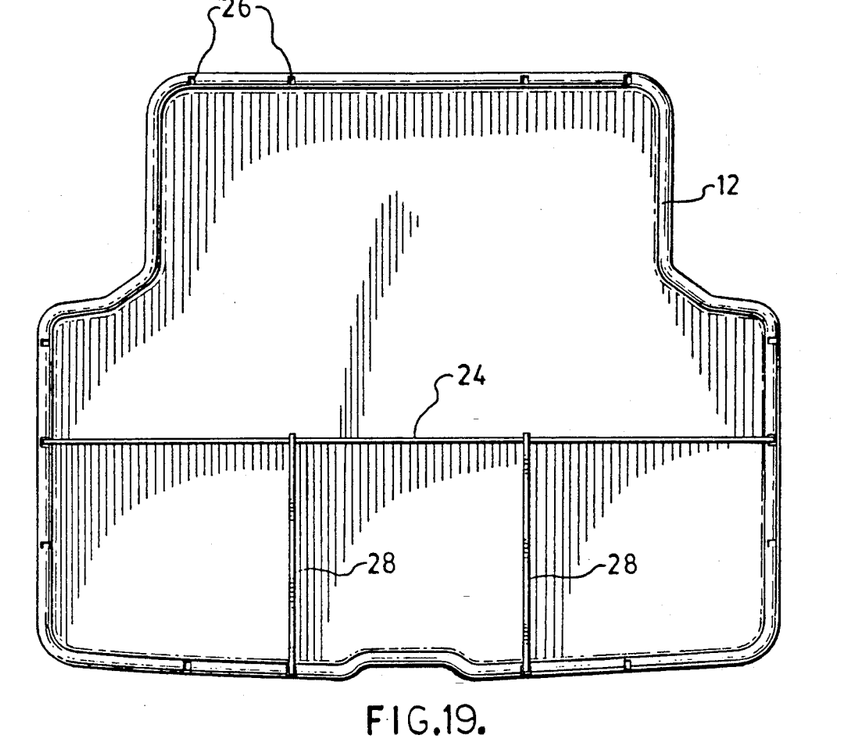
FIG. 19 is a plan view of the liner of FIGS. 18A and 18B.
Figure 20:
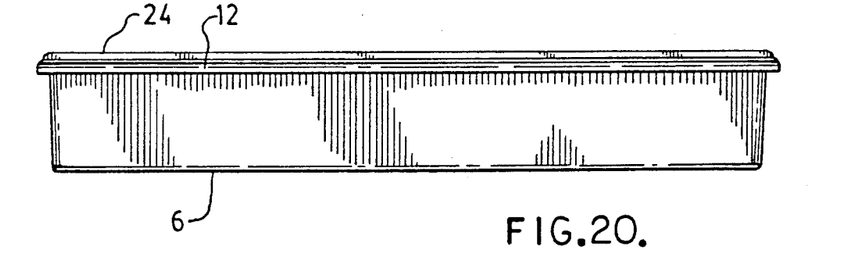
FIG. 20 is a side view of the liner of FIGS. 18A, 18B and 18C.
Figure 21:
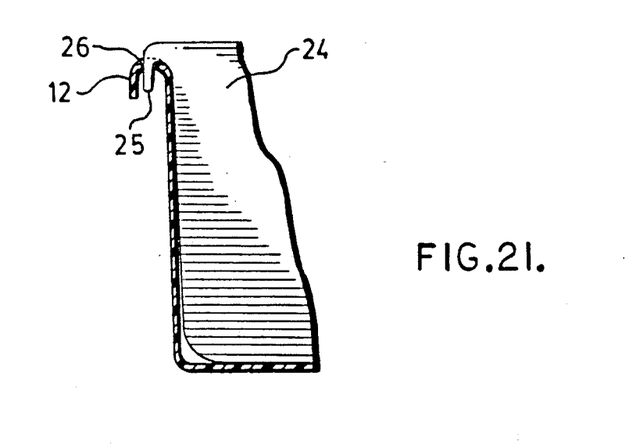
FIG. 21 is a side sectional view of the lip area of the liner of FIGS. 18A, 18B and 18C.

Similarly, another alternative would be as shown in FIGS. 17A and 17B, in which the bottom has a number of rectangular or square projections 45 therefrom.

If desired, the surface or surfaces (i.e. one or both sides) of the liner may be textured. For example, one of the four standard finishes produced on the extruded sheets used in thermoforming could be used. Those standard finishes include Levant, Haircell, Morocco, Sandgrain, and others. Other similar textured surfaces could be obtained by texturing the mold. This method would be suitable for injection molding, blow molding, or rotational molding, and could also be adapted to thermoforming by use of pressure forming or other techniques.

An advantageous feature of the preferred embodiment of the liner is compartmentalization, which is useful from a storage and organizational perspective, and may be achieved in a variety of ways.

For example, in the preferred embodiment, removable partitions or dividers could be inserted to provide compartments. Thus as shown in FIGS. 18A–21, one or more long lateral dividers 24 could be provided, these lateral dividers preferably having hook portions 25 which fit into holes 26 in the curled lip 12. One or more short fore and aft dividers 28 could hook into slots 30 in the lateral divider and additional holes 26 in the curled lip at the front and/or rear of the liner. The long and/or short dividers may be provided with optional hand grip cutout slots 29. As can be readily appreciated from FIGS. 18A–18C, this provides a wide variety of configuration options.

Figure 25A:
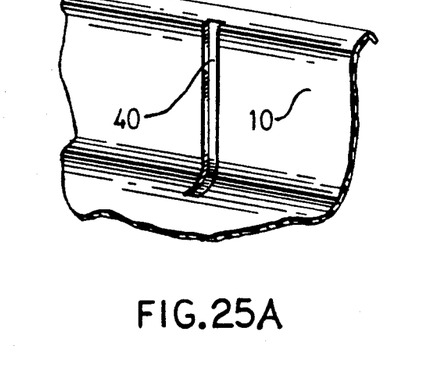
FIG. 25A is a view of the liner wall with an optional groove for receiving a divider.

As an alternative means of securing the divider, the liner wall could be provided with a groove 40 into which the divider fits, as shown in FIG. 25A. This would prevent the divider from bowing out at the bottom. The bottom of the liner could also be provided with a groove, if desired, for the divider to fit down into.

Figure 25B:
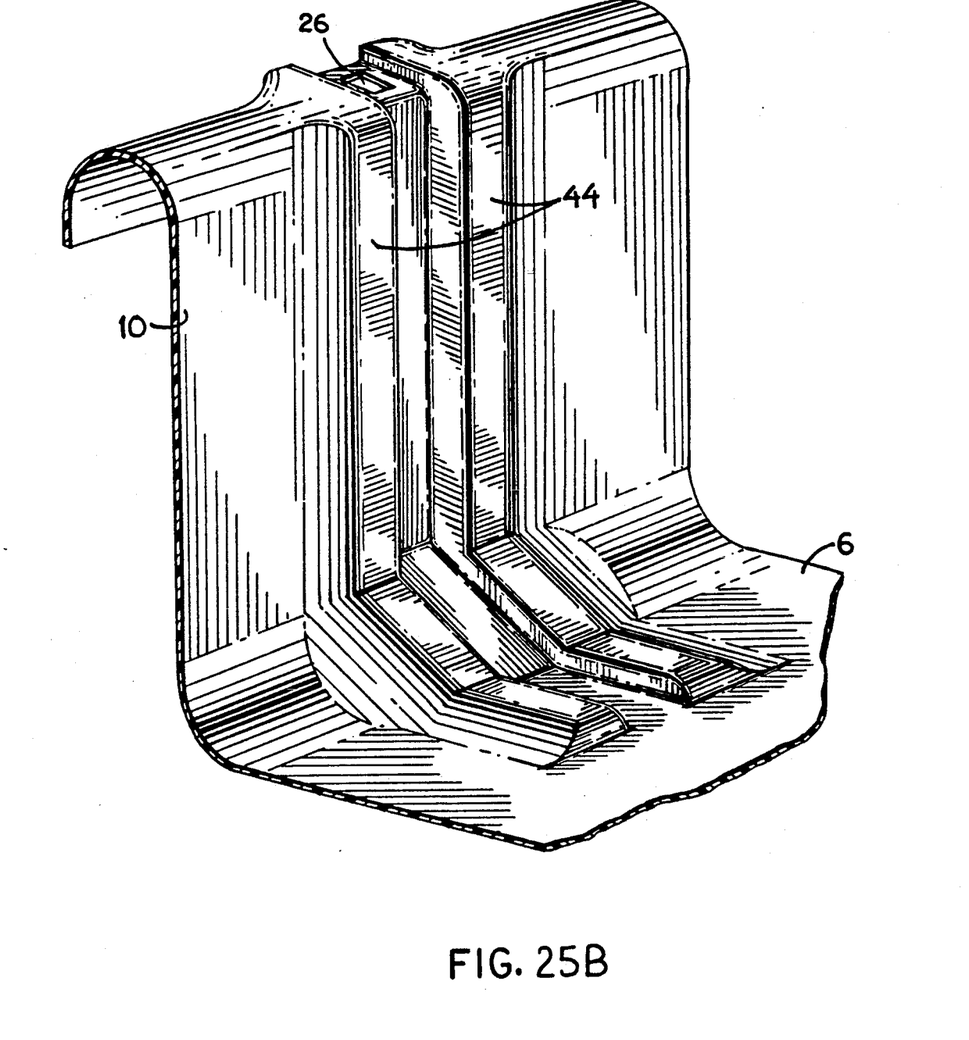
FIG. 25B is a view of the liner wall showing an alternative groove arrangement for receiving a divider.
Figure 25C:
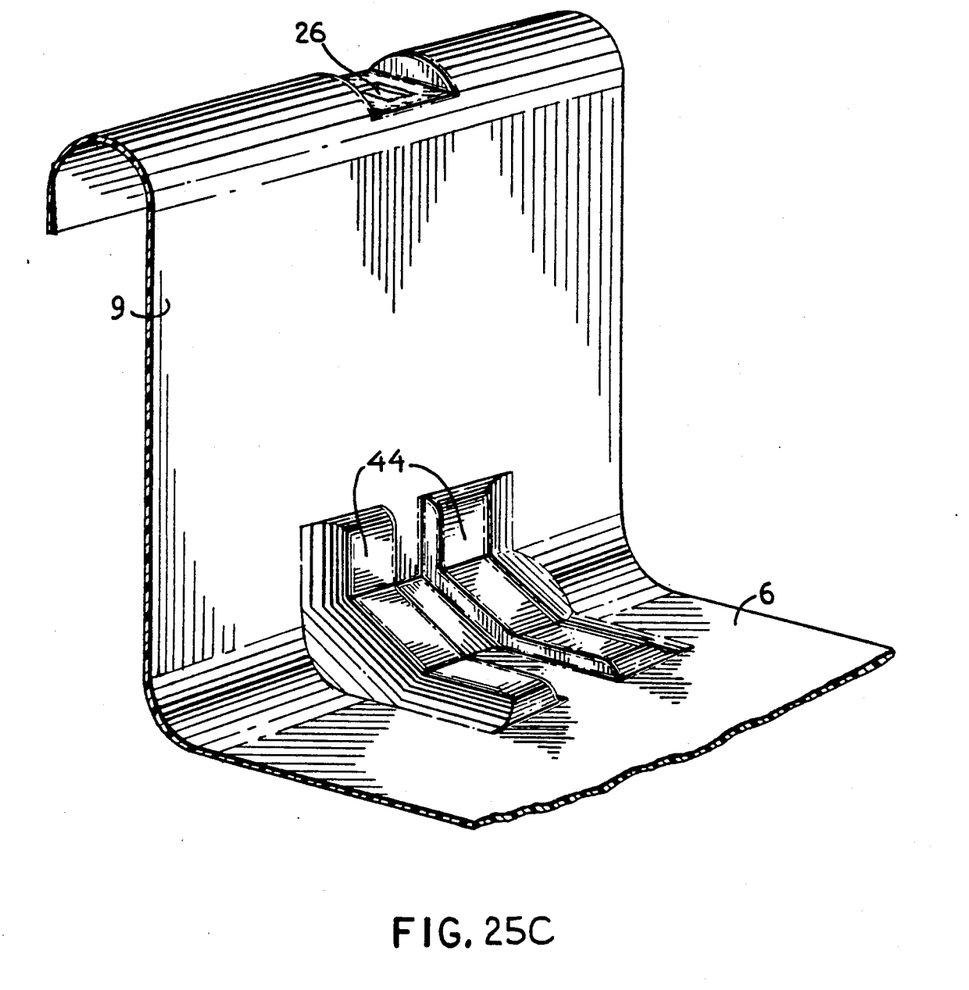
FIG. 25C is a view of the liner wall showing another alternative groove arrangement for receiving a divider.

Or, as shown in FIGS. 25B and 25C, a deeper groove could be provided by molding the wall to form inwardly-directed ribs 44, either over the whole groove area as shown in FIG. 25B, or only near the bottom of the liner, as shown in FIG. 25C. The FIG. 25B arrangement is preferred for use at either end of the long divider 24; the FIG. 25C arrangement is preferred for use at the wall end of the short dividers 28.

Figure 26:
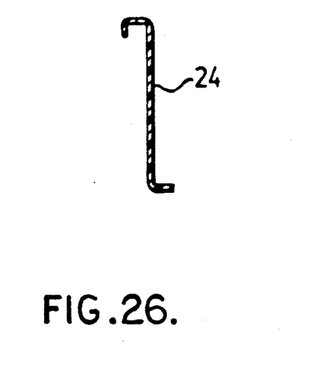
FIG. 26 is a cross-sectional view showing an alternative divider configuration.

The dividers, instead of being plain sheets, could have a structured cross-section for greater rigidity, as shown in FIG. 26. Or, for even greater strength and rigidity, and to aid in supporting the short dividers, the long divider may be provided with one or more horizontal ribs 42, having slots 43 therein to accommodate and support the short dividers.

Figure 22:
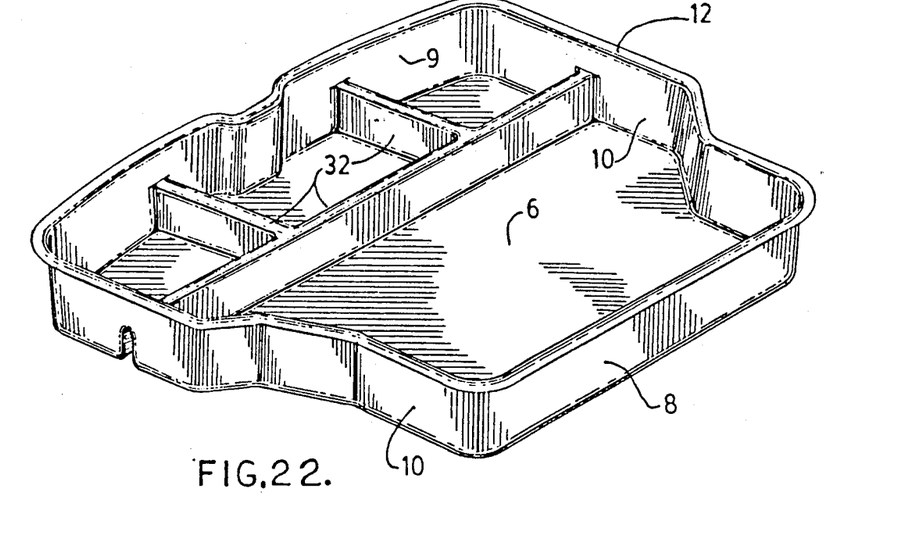
FIG. 22 is a perspective view of a liner having permanent dividers.
Figure 23:
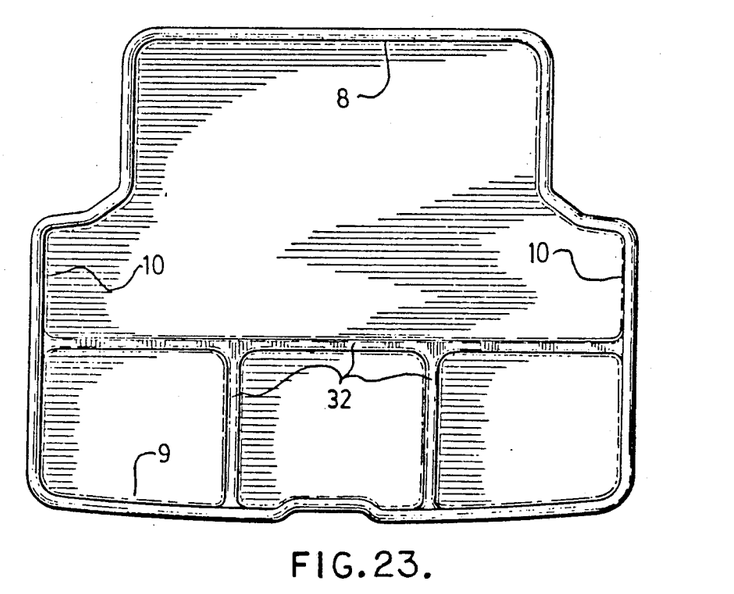
FIG. 23 is a plan view of the liner of FIG. 22.
Figure 24:
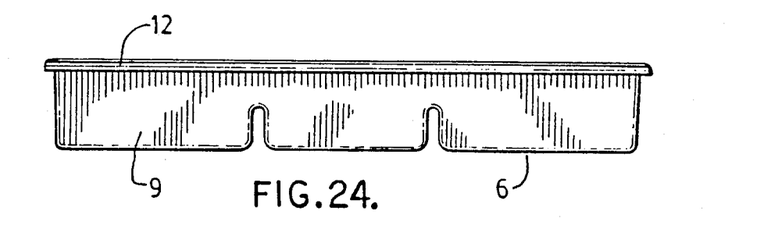
FIG. 24 is a side view of the liner of FIG. 22.

As an alternative to removable dividers, storage compartments could be formed by molding divider walls 32 as an integral part of the liner during molding, as shown in FIGS. 22–24. That is, the storage compartments would be permanent.

Alternatively, storage compartments of any material, size, or shape could be produced in a separate process, and could be attached to the liner wall, either permanently, or via snaps, velcro, or other temporary means.

A final compartmentalization alternative would be the use of self-storing inserts or dividers which can be collapsed when not needed. For example, the type of insert commonly provided in a beer case or grocery bag which could be folded or collapsed against the liner wall or floor when not in use could be provided. This could be a permanent installation, or could be removable via snap fasteners or the like.

Other accessories which would be useful in connection with the liner include a rubber mat for all or a portion of the bottom of the liner, to reduce the possibility of the cargo sliding around. Alternatively, straps could be provided, or a cargo net arrangement could be provided.

The liner may be manufactured using any number of structural thermoplastic or thermoset molding techniques. For example, the following thermoplastic techniques using heat and/or pressure could be used: thermoforming, i.e. vacuum forming using male or female molds; injection molding, i.e. resin heated and forced with pressure into the mold; blow molding, i.e. an extruded tube blown with air pressure against the mold cavity to form two liners at once; or rotational molding, in which the thermoplastic powder is fused in the mold by heat and rotation. For thermoset materials, hand lay-up, spray-up or compression molding could be used.

It will be appreciated that the above description relates to the preferred embodiment by way of example only. Many variations on the invention will be obvious to those knowledgeable in the field, and such obvious variations are within the scope of the invention as described and claimed, whether or not expressly described.

What is claimed is:

1. For use in a vehicle luggage compartment having generally a floor, a front wall, at least two side walls, and a rear wall, a plastic liner comprising:
    a bottom conforming generally to the shape of said floor, and integral rear, side and front walls, at least a portion of each of said liner walls generally conforming to corresponding portions of said compartment walls;
    at least one removable long divider adapted to be positioned across said liner between opposite liner walls, each said long divider and said liner walls being provided with means for engaging said long divider to secure it to said liner;
    at least one removable short divider adapted to be positioned between a wall of said liner and one said long divider, said short divider and said long divider and said liner wall being provided with means for engaging said short divider to secure it to said long divider and said liner wall, said long divider including reinforcing means along a substantial portion thereof.

2. A liner as recited in claim 1, in which said reinforcing means comprises at least one horizontal rib running along said long divider.

3. A liner as recited in claim 2, in which at least one said rib is on the side of said long divider facing said at least one short divider, and in which each said short divider has one end accommodated in a vertical groove defined in said at least one horizontal rib.

4. A liner as recited in claim 2, in which there are at least two said ribs spaced apart vertically on the same side of said long divider.

5. A liner as recited in claim 3, in which there are at least two said ribs spaced apart vertically on the side of said long divider facing said at least one short divider.

6. A liner as recited in claim 1, in which said reinforcing means comprises said long divider having a cross-section which is not merely rectangular.

7. In combination with a vehicle luggage compartment having generally a floor, a front wall, at least two side walls, and a rear wall, a plastic liner comprising:
    a bottom conforming generally to the shape of said floor, and integral rear, side and front walls, at least a portion of each of said liner walls generally conforming to corresponding portions of said compartment walls;
    at least one removable long divider adapted to be positioned across said liner between opposite liner walls, each said long divider and said liner being provided with means for engaging said long divider to secure it to said liner;
    at least one removable short divider adapted to be positioned between a wall of said liner and one said long divider, said short divider and said long divider and said liner being provided with means for engaging said short divider to secure it to said long divider and said liner wall, said long divider having reinforcing means along a substantial portion thereof.

8. A liner as recited in claim 7, in which said reinforcing means comprises at least one horizontal rib running along said long divider.

9. A liner as recited in claim 8, in which at least one said rib is on the side of said long divider facing said at least one short divider, and in which each said short divider has one end accommodated in a vertical groove defined in said at least one horizontal rib.

10. A liner as recited in claim 8, in which there are at least two said ribs spaced apart vertically on the same side of said long divider.

11. A liner as recited in claim 9, in which there are at least two said ribs spaced apart vertically on the side of said long divider facing said at least one short divider.

12. A liner as recited in claim 7, in which said reinforcing means comprises said long divider having a cross-section which is not merely rectangular.

* * * * *